March 28, 1944. C. R. HANNA 2,345,116
MACHINE TOOL TRACER REGULATOR
Filed July 24, 1940
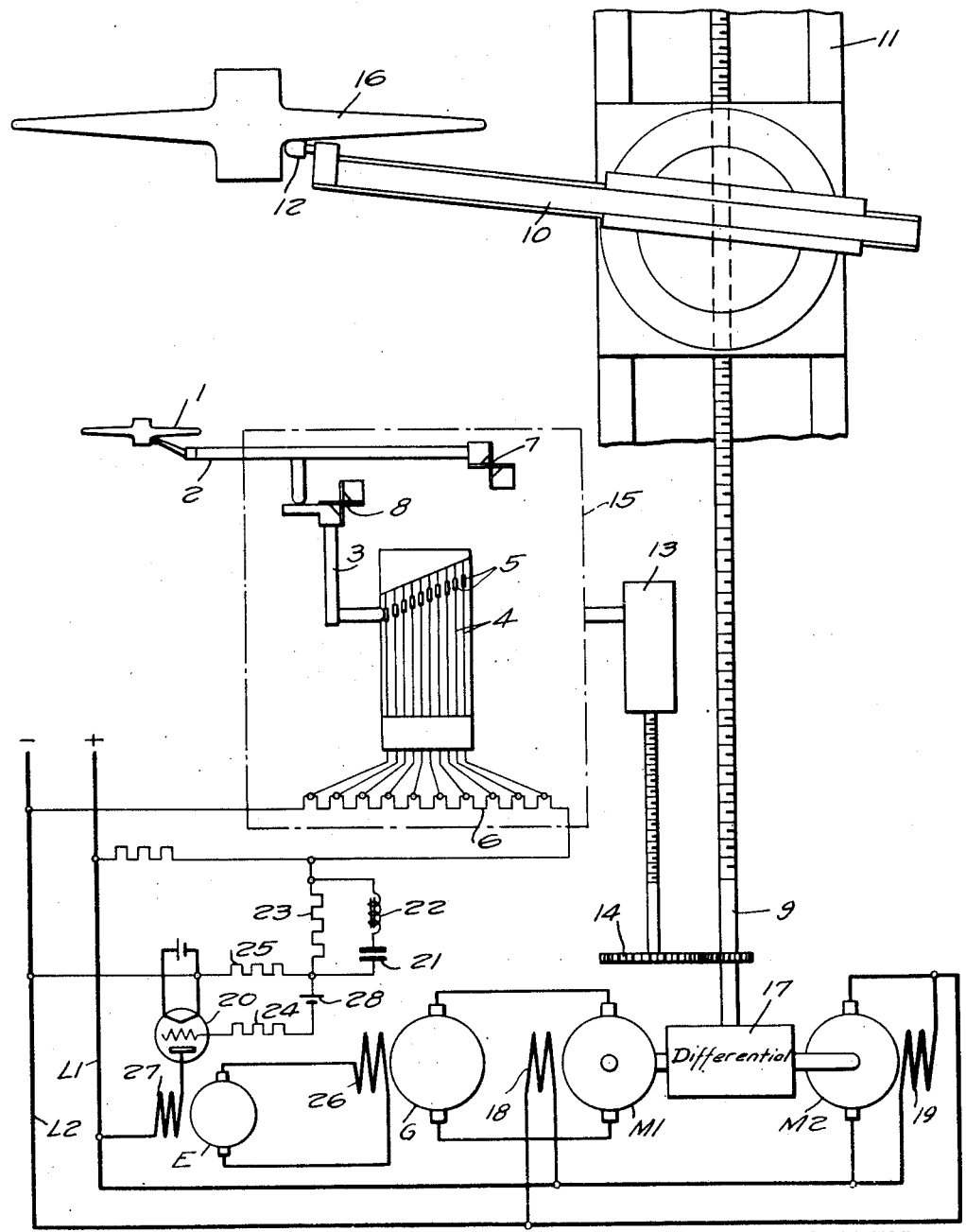
WITNESSES:
E. A. McCloskey
Wm. C. Groome
INVENTOR
Clinton R. Hanna.
BY
Paul E. Friedemann
ATTORNEY Patented Mar. 28, 1944

2,345,116

UNITED STATES PATENT OFFICE 2,345,116

MACHINE TOOL TRACER REGULATOR

Clinton R. Hanna, Pittsburgh, Pa., assignor to Westinghouse Electric & Manufacturing Company, East Pittsburgh, Pa., a corporation of Pennsylvania Application July 24, 1940, Serial No. 347,155

12 Claims. (Cl. 90—13.5)

My invention relates to a machine tool tracer regulator and it is specifically directed to a controlling means for anticipating and effecting changes of feed of a machining tool in accordance with configurations of a definite pattern or template.

An object of my invention is to provide a machine tool tracer regulator system which is simple and which has relatively small sized parts.

Another object of my invention is to provide a machine tool tracer regulator that is responsive not only to changes in configuration of a pattern or template but is responsive to the rate of change thereof, thereby providing an anticipatory scheme which is immediately responsive to the configuration of the pattern, allowing a higher order of precision in following without oscillation or hunting.

Other objects and advantages will become more apparent from a study of the following specification when considered in conjunction with the accompanying drawing, in which the single figure is a schematic showing of a control system embodying the principles of my invention.

Referring more particularly to the drawing, numeral 1 denotes a pattern or template of any desired configuration (a pattern for a ship propeller being shown) the contour of which is traced by a tracer or pilot member 2 biased against the pattern by suitable resilient means (not shown) or by gravity. A step-up lever 3 is provided so as to amplify or magnify the movements of the tracer so that sufficient motion may be produced to operate a plurality of bronze-leaved contact members 4 which carry silver contacts 5 for progressively shunting portions of a resistor or rheostatic regulator 6. The pivots 7 and 8 of the tracer and amplifying lever, respectively, are of the frictionless type and as such may be made of a pair or plurality of pairs of flat spring strips arranged at right angles to each other so as to provide angular freedom with a definite center of rotation. These parts are old in themselves and are shown and described in detail in a co-pending application of B. F. Langer and H. C. Werner, Serial No. 345,090, filed July 12, 1940, entitled "Devices for measurement of torque and thrust in a propeller shaft."

As will appear more fully hereinafter, the variations in the resistance of the resistor 6 will be effective to control the speed of a screw type drive shaft 9 which propels a tool support 10 on a track or bed plate 11 for feeding a machine tool 12 in a vertical direction. The screw shaft 9 simultaneously propels, through suitable reduction gearing such as indicated generally by 14, an element 13 which ultimately propels the supporting structure for the rheostatic regulator included within the area outlined by dotted lines 15.

For the sake of simplicity, the driving motor which rotates the machining tool 12 has not been shown nor has the motor which rotates the pattern 1 and work piece 16. The driving means for effecting lateral movement of the tool support 10 and the driving means for the tracer and rheostatic regulator unit, indicated by numeral 15, have also been omitted since these drives form no part of the present invention and since any well known means in the art may be used. My invention is directed solely to means for feeding the tool supporting member 10 in a particular direction (in the vertical direction, as indicated in the drawing). Reduction gearing 14 is necessary in instances in which the pattern 1 is of a reduced scale as compared to the work piece 16. In the event, however, that it is not desired to have a small pattern, as compared to the finished product, reduction gearing 14 would be eliminated and the rheostatic regulator and tracer unit would be propelled by unit 13 at exactly the same speed as the tool supporting element 10. Screw shaft 9 could be driven directly by a motor M1. However, if this were done, it would be necessary that such motor be reversed during operation. By providing a second motor M2 and mechanically coupling the shafts of both motors by the differential 17, it is then possible to have unidirectional operation of the control motor M1 with no necessity for reversal. The motor M2 in this instance, could be any suitable constant speed motor energized by a suitable source of potential indicated by L1—L2. Suitable field windings 18 and 19 are provided for motors M1 and M2, respectively.

For extremely accurate systems, the sensitivity to deviations in position is high with the result that hunting may take place unless precautions are taken. One means is to add inertia to the final drive so that the period of the regulated system as reckoned by the combined inertia and stiffness (the latter being the ratio of force developed at the tool per unit deviation in distance from its true position as prescribed by the model) of the regulator is long as compared to the longest time delay. From the standpoint of following curvatures, inertia is undesirable, but stability is of primary importance, and it has been found that in most cases sufficient following ability still remains even with the added flywheel effect.

Too much inertia would be needed, however, were it not for the anticipatory action of the control system which will be described hereinafter. This gives rise to a response to the changes and to the rate of change of the tracer position 2 as the result of the varying configuration of pattern 1. A grid-controlled vacuum tube 20 is provided in the control circuit. The grid of such tube is biased by two components of voltage. First, it is biased by a voltage which is modified by the resistance changes of resistor 6 as the result of changes in the position of the tracer 2. Secondly, it is impressed with a voltage which is proportional to the rate of change of the position of the tracer 2, as effected by charging and discharging of a condenser 21. In view of the stepped nature of current changes provided by the Silverstat, a reactor 22 is connected in series with condenser 21 in order to limit the otherwise high current flow therethrough. A resistor 23 bridges both elements 21 and 22 and is connected in series with a grid protecting resistor 24 which, in turn, is connected to the grid of tube 20 in series with a biasing battery 25. Since the grid is responsive, not only to the changes of resistor 6, but to the rate of changes thereof as well, a control system will be afforded which will closely follow and, in fact, anticipate the movements of the tracer 2.

Because of this extremely close following of the movements of tracer 2 afforded by the anticipatory circuit, very small motions of the tracer will be necessary throughout the tracing operation. For example, for zero screw speed, the rheostatic regulator is deflected half way, requiring the tracer to be depressed .001". A movement of .001" either way will result in full speed of the screw in either direction. Thus if the model is one-fifth scale, the maximum error is ±.005". Different tracer lever ratios may be provided for each model ratio so as to make the error at the work independent of the model size.

The tube amplifier is provided in the control system mainly because the anticipating circuit including condenser 21 and resistor 23 greatly reduces the power from the regulator circuit. For example, resistor 23 may be of the value of 1 megohm, whereas resistor 25 may be about $\frac{1}{10}$ as much. The anticipatory circuit gives rise to a response to velocity as well as to position, resulting in earlier correction by a time T, which is the time constant of the condenser resistor combination 21—23. Time T must be greater than the longest time delay, which in the present system is imposed by the field winding 26 of generator G. As an example, time T might have to be one second for best system damping. This may be obtained by using a 1 mfd. condenser 21 across a 1 megohm resistor 23. As stated before, since resistor 23 may be of the order of 10 times as great as resistor 25, in order to make the grid sufficiently responsive to the rate of change of tracer 2 through the charging action of condenser 21, it will be readily seen that such resistor condenser combination consumes a large fraction of the power.

However, by providing the circuit as shown including the grid-controlled tube, I am able to compensate for the power consumption. The discharge current through tube 20 is varied and conducted through the field winding 27 of an exciter E. The exciter, on the other hand, energizes the field winding 26 of generator G. I prefer to use a generator G instead of exciting a motor directly by field winding 26 for the reason that a much wider range of speed control can be secured by the variable voltage system shown.

From the known time delays of the generator and motor circuits, it has been determined just how much anticipating effect is needed for good stability of the regulated system. Accurate following over the required contours at the necessary speeds of cutting have been predicted mathematically. No hunting or prolonged free vibration of the regulator will occur. In making such computations, the inertia of the variable speed system, and the net stiffness (or accuracy) of the regulator are also included. Experience on many similar regulators has proven that accurate computation of their characteristics can be made ahead of time and proven in the actual device.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A position regulator comprising a follow-up member, means for driving said follow-up member, a pilot member, means coacting with the pilot member for controlling the means for driving the follow-up member, said coacting means including a resistor having spaced multiple flexible shunt contacts tapped thereon for progressively shunting portions of said resistor, and lever means between said contacts and pilot member for progressively operating said contacts in accordance with the contour of said pilot member, electric circuit means including said resistor, a condenser, and an electric tube which includes a grid, said resistor effecting changes in the potential of said grid in accordance with the successive movements of said pilot member and said condenser effecting changes in the potential of said grid in accordance with the rate of changes of resistance of said resistor so as to accurately control said follow-up member.

2. A position regulator comprising a follow-up member, means for driving said follow-up member, a pilot member, means coacting with the pilot member for controlling the means for driving the follow-up member, said coacting means including a resistor having spaced multiple flexible shunt contacts tapped thereon for progressively shunting portions of said resistor, and lever means between said contacts and pilot member for progressively operating said contacts in accordance with the contour of said template, electronic circuit means including a source of power and said resistor, connected across said source, also including an electronic tube having a grid and having in series with said grid, a second resistor and a reactor and condenser which serially shunt the second resistor, said first mentioned resistor effecting changes in grid potential in accordance with successive movements of said pilot member and said condenser effecting changes in grid potential, in accordance with the successive rate of change of said movements of the pilot member so as to accurately control said follow-up member, said reactor reducing the current flow effected by the changes in resistance of said first mentioned resistor.

3. A position regulator comprising a follow-up member, means for driving said follow-up member, a pilot member, means coacting with the pilot member for controlling the means for driving the follow-up member, said coacting means including a resistor having spaced multiple flexible shunt contacts tapped thereon for progressively shunting portions of said resistor, and lever means between said contacts and pilot member for progressively operating said contacts in accordance with the contour of said pilot member, electronic circuit means including a source of power and said resistor, connected across said source, also including an electronic tube having a grid and having in series with said grid, a second resistor and a reactor and condenser which serially shunt the second resistor, said first mentioned resistor effecting changes in grid potential in accordance with successive movements of said pilot member and said condenser effecting changes in grid potential, in accordance with the successive rate of change of said movements of the pilot member so as to accurately control said follow-up member, said reactor reducing the current flow effected by the changes in resistance of said first mentioned resistor, said means for driving the follow-up member including a variable voltage system comprising an exciter variably excited in accordance with variations of said grid, a generator energized by said exciter and a feed motor whose speed is controlled by said generator for feeding the follow-up member in accordance with variations of the voltage on said grid.

4. A position regulator comprising a follow-up member, means for driving said follow-up member, a pilot member, means coacting with the pilot member for controlling the means for driving the follow-up member, said coacting means including a resistor having spaced multiple flexible shunt contacts tapped thereon for progressively shunting portions of said resistor, and lever means between said contacts and pilot member for progressively operating said contacts in accordance with the contour of said template, electronic circuit means including a source of power and said resistor, connected across said source, also including an electronic tube having a grid and having in series with said grid, a second resistor and a reactor and condenser which serially shunt the second resistor, said first mentioned resistor effecting changes in grid potential in accordance with successive movements of said pilot member and said condenser effecting changes in grid potential, in accordance with the successive rate of change of said movements of the pilot member so as to accurately control said follow-up member, said reactor reducing the current flow effected by the changes in resistance of said first mentioned resistor, said means for driving the follow-up member including a variable voltage system comprising an exciter variably excited in accordance with variations of said grid, a generator energized by said exciter and a feed motor whose speed is controlled by said generator for feeding the follow-up member in accordance with variations of the voltage on said grid and a second feed motor mechanically coupled to said first mentioned feed motor through a differential mechanism, said follow-up member being driven by the remaining element of said differential, said first mentioned motor being unidirectional throughout its entire operation.

5. In a tracer regulating system, in combination, a follow-up member, a tracer mechanically geared to said follow-up member through mechanical gearing, a feed motor for driving said mechanical gearing, hence for simultaneously driving said follow-up member and tracer, control means for said feed motor including a resistor having a plurality of shunting contacts, each pair of which shunts a different portion of said resistor, lever means interposed between said tracer and said contacts for amplifying its movement and imparting it to said contacts so as to progressively shunt said resistor portions in accordance with the changes in configuration of said template, all of the pivots of said lever means being elastic and devoid of friction.

6. In a tracer regulating system, in combination, a follow-up member, a tracer mechanically geared to said follow-up member through mechanical gearing, a feed motor for driving said mechanical reduction gearing, hence for simultaneously driving said follow-up member and tracer, control means for said feed motor including a resistor having a plurality of shunting contacts, each pair of which shunts a different portion of said resistor, a template, lever means interposed between said tracer and said contacts for amplifying its movement and imparting it to said contacts so as to progressively shunt said resistor portions in accordance with the changes in configuration of said template, all of the pivots of said lever means being formed of flat springs mounted at right angles for providing substantially frictionless movements at the pivots.

7. In a system of control for a milling machine adapted to operate on a work piece, in combination, a tool, a tracer mechanically geared to said tool through mechanical gearing, a feed motor for driving said mechanical reduction gearing, hence for simultaneously driving said tool and tracer, control means for said feed motor including a resistor having a plurality of shunting contacts, each pair of which shunts a different portion of said resistor, lever means interposed between said tracer and said contacts for amplifying its movement and imparting it to said contacts so as to progressively shunt said resistor portions in accordance with the changes in configuration of said template, all of the pivots of said lever means being formed of flat springs mounted at right angles for providing universal movements at the pivots, electronic circuit means including said resistor, a condenser and an electronic tube which includes a grid, said resistor effecting changes in the potential of said grid in accordance with the successive changes of configuration of said template and said condenser effecting changes in the potential of said grid in accordance with the rate of changes of configuration of said template so as to accurately control said tool controlling means.

8. In a system of control for a milling machine adapted to operate on a work piece, in combination, a tool, a tracer mechanically geared to said tool through mechanical gearing, a feed motor for driving said mechanical reduction gearing, hence for simultaneously driving said tool and tracer, control means for said feed motor including a resistor having a plurality of shunting contacts, each pair of which shunts a different portion of said resistor, lever means interposed between said tracer and said contacts for amplifying its movement and imparting it to said contacts so as to progressively shunt said resistor portions in accordance with the changes in configuration of said template, all of the pivots of said lever means being formed of flat springs mounted at right angles for providing universal movements at the pivots, electronic circuit means including a source of power and said resistor, connected across said source, also including an electronic tube having a grid and having in series with said grid a second resistor and a reactor and condenser which serially shunt the second resistor, said first mentioned resistor effecting changes in grid potential in accordance with successive changes in configuration of said template and said condenser effecting changes in grid potential in accordance with the successive rate of change of said configuration so as to accurately control said tool controlling means, said reactor reducing the current flow effected by the changes in resistance of said first mentioned resistor.

9. In a system of control for a milling machine adapted to operate on a work piece, in combination, a tool, a tracer mechanically geared to said tool through mechanical gearing, a feed motor for driving said mechanical reduction gearing, hence for simultaneously driving said tool and tracer, control means for said feed motor including a resistor having a plurality of shunting contacts, each pair of which shunts a different portion of said resistor, lever means interposed between said tracer and said contacts for amplifying its movement and imparting it to said contacts so as to progressively shunt said resistor portions in accordance with the changes in configuration of said template, all of the pivots of said lever means being formed of flat springs mounted at right angles for providing universal movements at the pivots, said tool control means including a variable voltage system comprising an exciter variably excited in accordance with variations of said grid, a generator energized by said exciter and a feed motor whose speed is controlled by said generator for feeding the tool in accordance with variations of the voltage of said grid.

10. In a system of control for a milling machine adapted to operate on a work piece, in combination, a tool, a tracer mechanically geared to said tool through mechanical reduction gearing and adapted to scan a template, a feed motor coupled, through said reduction gearing, for simultaneously driving said tool and tracer, control means for said feed motor including a resistor having a plurality of shunting contacts, each pair of which shunts a different portion of said resistor, lever means interposed between said tracer and said contacts for amplifying its movement and imparting it to said contacts so as to progressively shunt said resistor portions in accordance with the changes in configuration of said template, all of the pivots of said lever means being formed of flat springs mounted at right angles for providing substantially frictionless movements at the pivots, and a second feed motor mechanically coupled to said first mentioned feed motor through a differential mechanism, said tool being thus fed by the remaining element of said differential, said first mentioned motor being unidirectional throughout its entire operation.

11. A machine tool tracer regulator comprising, in combination, a tool, means for feeding said tool, a template, variable resistance means coacting with the template for controlling the means for moving the tool, electric circuit means including said variable resistance means, a condenser and an electronic tube which includes a grid, said variable resistance means effecting changes in the potential of said grid, in accordance with movements of said variable resistance means along the contour of said template, said condenser being electrically connected so as to effect changes in the potential of said grid in accordance with the rate of change of resistance of said variable resistance means so as to effect accurate follow-up and minimize hunting of said tool feeding means.

12. A machine tool tracer regulator comprising a tool, means for feeding said tool, a template, means coacting with the template for controlling the means for moving the tool, said last named means including a resistor having multiple flexible shunt contacts for progressively shunting portions of said resistor, and lever means between said contacts and template for progressively operating said contacts in accordance with the contour of said template, and mechanical transmission means for mechanically coupling said template coacting means with said tool feeding means.

CLINTON R. HANNA.